(12) United States Patent
Akasaka (10) Patent No.: US 7,565,083 B1
(45) Date of Patent: Jul. 21, 2009

(54) WAVELENGTH SHIFTING IN AN OPTICAL NETWORK ROUTE TO MITIGATE DISTORTION IN DIFFERENT TYPES OF FIBER

(75) Inventor: Youichi Akasaka, Foster City, CA (US)

(73) Assignee: Sprint Communications Company L.P., Overland Parks, KS (US)

(*) Notice: Subject to any disclaimer, the term of this patent is extended or adjusted under 35 U.S.C. 154(b) by 599 days.

(21) Appl. No.: 10/873,888

(22) Filed: Jun. 22, 2004

(51) Int. Cl.
H04B 10/16 (2006.01)
H04B 10/02 (2006.01)
H01S 3/00 (2006.01)
H04J 14/02 (2006.01)

(52) U.S. Cl. .................. 398/159; 398/140; 398/141; 398/142; 398/158; 398/177; 398/178

(58) Field of Classification Search .......... 398/176, 398/179, 175, 140–142, 158, 159, 177, 178
See application file for complete search history.

(56) References Cited

U.S. PATENT DOCUMENTS

| 5,416,625 | A | * | 5/1995 | Cavaciuti et al. | 398/98 |
|---|---|---|---|---|---|
| 5,530,583 | A | * | 6/1996 | Uno et al. | 359/337.4 |
| 5,696,614 | A | * | 12/1997 | Ishikawa et al. | 398/81 |
| 5,712,716 | A | * | 1/1998 | Vanoli et al. | 398/34 |
| 5,786,918 | A | * | 7/1998 | Suzuki et al. | 398/98 |
| 5,847,862 | A | * | 12/1998 | Chraplyvy et al. | 359/337 |
| 6,081,355 | A | * | 6/2000 | Sharma et al. | 398/90 |
| 6,115,173 | A | * | 9/2000 | Tanaka et al. | 359/333 |
| 6,324,317 | B1 | * | 11/2001 | Tanaka et al. | 385/24 |
| 6,330,104 | B1 | * | 12/2001 | Kim et al. | 359/332 |
| 6,342,962 | B2 | * | 1/2002 | Marcerou et al. | 398/146 |
| 6,407,834 | B1 | * | 6/2002 | Takeshita et al. | 398/175 |
| 6,504,638 | B1 | * | 1/2003 | Tanaka et al. | 398/97 |
| 6,509,987 | B1 | * | 1/2003 | Hunziker et al. | 398/79 |
| 6,583,905 | B1 | * | 6/2003 | Bonato et al. | 398/158 |
| 6,626,591 | B1 | * | 9/2003 | Bellotti et al. | 398/79 |
| 6,674,973 | B2 | * | 1/2004 | Leclerc et al. | 398/175 |
| 6,751,421 | B1 | * | 6/2004 | Ranka et al. | 398/141 |
| 6,760,151 | B1 | * | 7/2004 | Vail et al. | 359/341.3 |
| 6,862,135 | B2 | * | 3/2005 | Evans et al. | 359/337.1 |
| 7,010,235 | B2 | * | 3/2006 | Ueno | 398/178 |
| 7,039,324 | B2 | * | 5/2006 | Watanabe | 398/158 |
| 7,058,305 | B2 | * | 6/2006 | Horinouchi et al. | 398/105 |
| 7,058,311 | B1 | * | 6/2006 | Islam et al. | 398/140 |
| 7,068,950 | B2 | * | 6/2006 | Sinsky | 398/198 |
| 7,076,174 | B2 | * | 7/2006 | Watanabe et al. | 398/158 |
| 7,139,453 | B2 | * | 11/2006 | Takeyama et al. | 385/27 |

(Continued)

*Primary Examiner*—Ken N Vanderpuye
*Assistant Examiner*—Danny W Leung (57) ABSTRACT

An optical network route and method are disclosed that mitigate distortion in a route having different types of fibers. For an optical network route that includes a plurality of fiber spans of a first type and a fiber span of a second type, assume that the optical network route is transporting optical signals having a plurality of original wavelengths where one or more of the original wavelengths is in a distortion wavelength region of the second type of fiber span. For optical signals entering the second type of fiber span, the original wavelength that is in the distortion wavelength region of the second type of fiber span is shifted to a temporary wavelength outside of the distortion wavelength region. The optical signals then travel over the second type of fiber span. For optical signals exiting the second type of fiber span, the temporary wavelength is shifted back to the original wavelength.

20 Claims, 5 Drawing Sheets

U.S. PATENT DOCUMENTS

| | | | |
|---|---|---|---|
| 7,149,433 B2 * | 12/2006 | Grubb et al. | 398/175 |
| 7,153,034 B2 * | 12/2006 | Sasaoka et al. | 385/71 |
| 7,197,245 B1 * | 3/2007 | Islam et al. | 398/82 |
| 7,280,765 B2 * | 10/2007 | Chowdhury et al. | 398/159 |
| 2005/0226286 A1 * | 10/2005 | Liu et al. | 372/25 |
| 2009/0016740 A1 * | 1/2009 | Mahgerefteh et al. | 398/158 |

* cited by examiner

WAVELENGTH SHIFTING IN AN OPTICAL NETWORK ROUTE TO MITIGATE DISTORTION IN DIFFERENT TYPES OF FIBER

BACKGROUND OF THE INVENTION

1. Field of the Invention

The invention is related to the field of optical networks, and in particular, to shifting wavelengths in optical network routes to mitigate distortion in different types of fiber.

2. Statement of the Problem

Many communication companies use fiber optic cabling as a media for transmitting data because of its high bandwidth capacity. The optical fibers of a fiber optic cable can reliably transport optical signals over long distances. Optical fibers inherently have nonlinearities which cause nonlinearity effects in optical signals as the optical signals travel over the optical fiber. Some common nonlinearity effects are cross-phase modulation (XPM), self-phase modulation (SPM), four-wave mixing (FWM), stimulated Raman scattering (SRS), and stimulated Brillouin scattering (SBS). As the optical signals travel over an optical fiber, the nonlinearity effects of the optical fiber may contribute to the optical signals distorting in the optical fiber. Excessive distortion of the optical signals can unfortunately result in a loss of data being carried by the optical signals.

A typical optical network route within a long haul network or an ultra-long haul network includes a transmitter node, a plurality of fiber spans, amplifiers, regenerator nodes, and a receiver node. An amplifier or regenerator node is positioned between one or more fiber spans to compensate for signal attenuation. Typically, optical network routes are comprised of fiber spans of the same type fiber. However, some optical network routes have one or more fiber spans that are a different type of transmission fiber than the rest of the fiber spans on the route, which can be problematic.

There are currently several types of transmission fiber, such as standard Single Mode Fiber (SMF), Dispersion Shifted Fiber (DSF), and Non-Zero Dispersion Shifted Fiber (NZ-DSF). Using different types of transmission fiber in the same route can cause problems because different fibers may have different nonlinearity effects on optical signals. The different types of fibers may cause signal distortion at different wavelengths making it difficult to select which wavelengths may be used over a particular route.

As an example, a Single Mode Fiber (SMF) has a zero dispersion wavelength at about 1310 nm. A Dispersion Shifted Fiber (DSF) has a zero dispersion wavelength at about 1550 nm and a small dispersion region between 1540 nm to 1560 nm. A Non-Zero Dispersion Shifted Fiber (NZ-DSF) has a zero dispersion region from 1550 nm to 1525 nm or from 1550 nm to 1575 nm (depending on the kind of NZ-DSF). Assume an optical network route includes multiple spans of single mode fiber and one span of dispersion shifted fiber. The single mode fiber spans have strong nonlinearity effects on wavelengths at about 1310 nm. Consequently, network administrators avoid using wavelengths around 1310 nm for optical signals traveling over single mode fiber spans. The dispersion shifted fiber span has strong nonlinearity effects on wavelengths between 1540 nm and 1560 nm. Thus, network administrators avoid using wavelengths between 1540 nm and 1560 nm for optical signals traveling over the dispersion shifted fiber span.

Unfortunately, usable wavelengths are being wasted on this optical network route because different types of fiber are being used. For this optical network route, network administrators avoid wavelengths in the region of 1540 nm to 1560 nm because of the dispersion shifted fiber span, but these wavelengths are wasted on the single mode fiber spans. Wavelengths in the 1540 nm to 1560 nm region could be used on the single mode fiber spans but are not because of the high nonlinearity effects of the dispersion shifted fiber span in this region. The 1540 nm to 1560 nm region comprises much of the C-band, which is used often for carrying data. Network administrators may desire to use certain wavelengths even though one or more types of fiber in an optical network route have high nonlinearity effects at those wavelengths.

SUMMARY OF THE SOLUTION

The invention helps solve the above and other problems by shifting wavelengths for certain types of fiber in an optical network route to mitigate the distortion caused by the fiber. Advantageously, network administrators may use more wavelengths for data transmission in an optical network route that is comprised of different types of fiber.

One embodiment of the invention comprises a method of mitigating distortion in an optical network route having different types of fibers. The optical network route includes a plurality of fiber spans of a first type and a fiber span of a second type. The second type of fiber span has a distortion wavelength region that can highly distort wavelengths within that region. In this embodiment, the optical network route is transporting optical signals having a plurality of wavelengths where one or more of the wavelengths are in the distortion wavelength region of the second type of fiber span. For the method, one step includes shifting one or more of the original wavelengths that are in the distortion wavelength region of the second type of fiber span to temporary wavelengths outside of the distortion wavelength region. This shifting step occurs for optical signals entering the second type of fiber span. The optical signals then travel over the second type of fiber span. Another step of the method includes shifting the temporary wavelengths outside of the distortion wavelength region back to their original wavelengths. This shifting step occurs for the optical signals exiting the second type of fiber span.

By shifting the wavelengths in the distortion wavelength region for optical signals traveling over the second type of fiber span, the distortion wavelength region is avoided for the second type of fiber span. Consequently, the wavelengths in the distortion wavelength region may be used to carry data over the optical network route without concern over the effects of the distortion wavelength region of the second type of fiber span.

The invention may include other embodiments described below.

DESCRIPTION OF THE DRAWINGS

The same reference number represents the same element on all drawings.

DETAILED DESCRIPTION OF THE INVENTION

FIGS. 1, 2A-2E, 3-4, and 5A-5E and the following description depict specific embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to these specific embodiments described below, but only by the claims and their equivalents.

Figure 1:
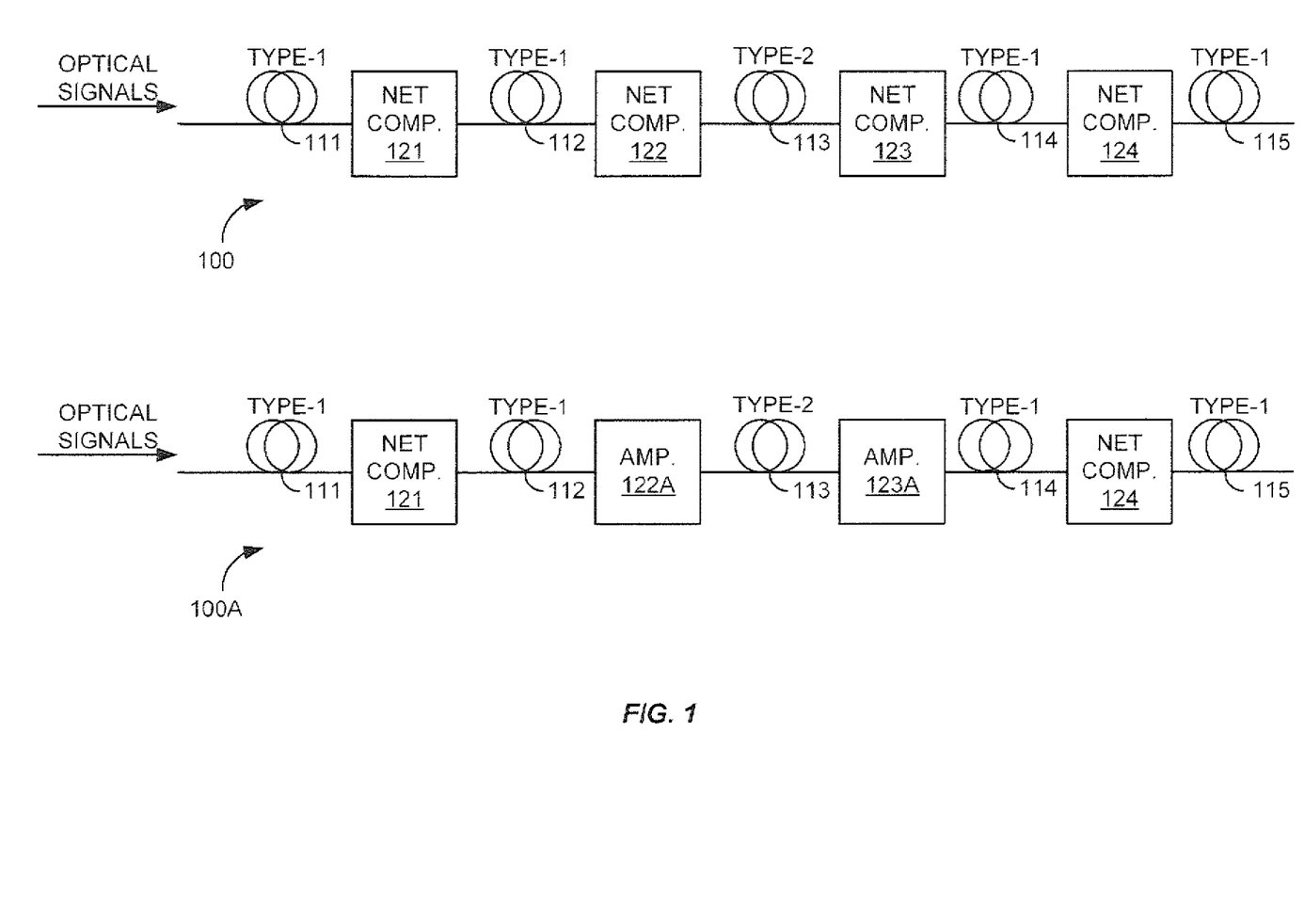
FIG. 1 illustrates an optical network route in an embodiment of the invention.

FIG. 1 illustrates an optical network route 100 in an embodiment of the invention. Optical network route 100 is part of a larger optical communication network (not shown). Optical network route 100 is comprised of a plurality of fiber spans 111-115 and a plurality of network components 121-124. Fiber span 111 connects to network component 121. Fiber span 112 connects network component 121 to network component 122. Fiber span 113 connects network component 122 to network component 123. Fiber span 114 connects network component 123 to network component 124. Fiber span 115 connects to network component 124. The number of network components and fiber spans is just for illustration in FIG. 1, and optical network route 100 may include any number of network components, fiber spans, or other devices or components not shown.

Fiber spans 111-115 comprise transmission fibers, such as standard Single Mode Fiber (SMF), Dispersion Shifted Fiber (DSF), Non-Zero Dispersion Shifted Fiber (NZ-DSF), or any other type of transmission fiber. Fiber spans 111, 112, 114, and 115 comprise type-1 transmission fibers and fiber span 113 comprises a type-2 transmission fiber. The terms "type-1" and "type-2" are not intended to indicate any industry standard type of fiber, but just to differentiate one type of fiber from another. A type-1 transmission fiber is different than a type-2 transmission fiber in that one or more properties of the type-1 transmission fiber distort or otherwise affect different wavelengths of optical signals than a type-2 transmission fiber. For instance, the nonlinearity effects of a type-1 transmission fiber may distort different wavelengths of optical signals than the nonlinearity effects of a type-2 transmission fiber. A "fiber span" may include one or more lengths of transmission fiber of the same type.

Network components 121-124 comprise any optical components or optical-to-electrical-to-optical components that connect fiber spans to one another. Examples of network components include wavelength converters, amplifiers (optical or otherwise), regenerator nodes, transmitter nodes, receiver nodes, or any combination thereof. Optical network route 100 comprises any route or path of an optical communication network. Optical network route 100 may comprise a route on a long haul network, an ultra-long haul network, a Wavelength Division Multiplexed (WDM) network, a Dense WDM (DWDM) network, a Course WDM (CWDM) network, or some other type of optical communication system.

Figure 2A:
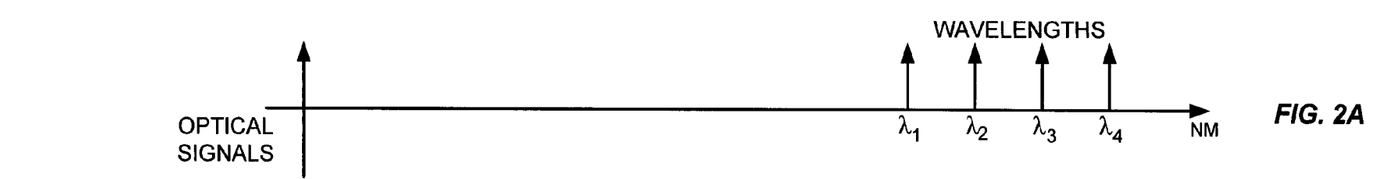
FIG. 2A illustrates wavelengths of optical signals traveling on the optical network route of FIG. 1 in an embodiment of the invention.

When in operation, optical network route 100 receives optical signals to transport. The optical signals include one or more wavelengths that carry data. FIGS. 2A-2E are graphs stacked vertically to show wavelengths corresponding with one another. FIG. 2A illustrates the wavelengths ($\lambda_1$-$\lambda_4$) of the optical signals in an embodiment of the invention. The optical signals could include more or less wavelengths than the ones shown in FIG. 2A in other embodiments.

Figure 2B:
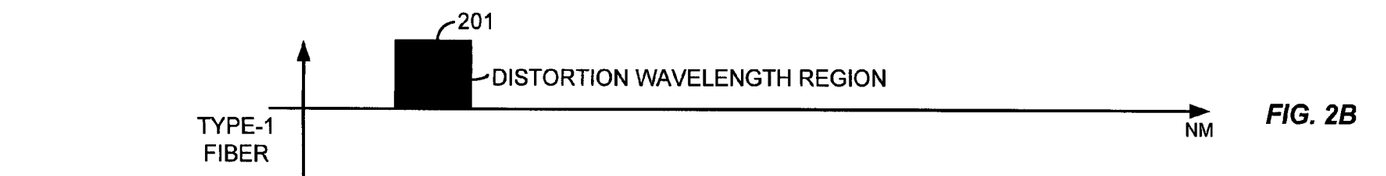
FIG. 2B illustrates a distortion wavelength region of a type-1 fiber span in an embodiment of the invention.

FIG. 2B illustrates a distortion wavelength region 201 of the type-1 fiber spans 111, 112, 114, and 115 in an embodiment of the invention. The distortion wavelength region 201 is the range of wavelengths that is highly distorted by a type-1 fiber span. Optical signals in the highly distorted wavelength range result in more than 100 times the errors of other wavelengths ranges. The distortion wavelength region 201 may comprise a high nonlinearity wavelength region for the type-1 fiber spans 111, 112, 114, and 115. For instance, a zero dispersion wavelength region of a single mode fiber (e.g., around 1310 nm) may comprise the distortion wavelength region for a single mode fiber. Comparing the wavelengths of the optical signals shown in FIG. 2A to the distortion wavelength region 201 of the type-1 fiber spans 111, 112, 114, and 115 shown in FIG. 2B, the wavelengths of the optical signals do not fall within the distortion wavelength region 201 of the type-1 fiber spans 111, 112, 114, and 115.

Figures 2C, 2D, 2E:
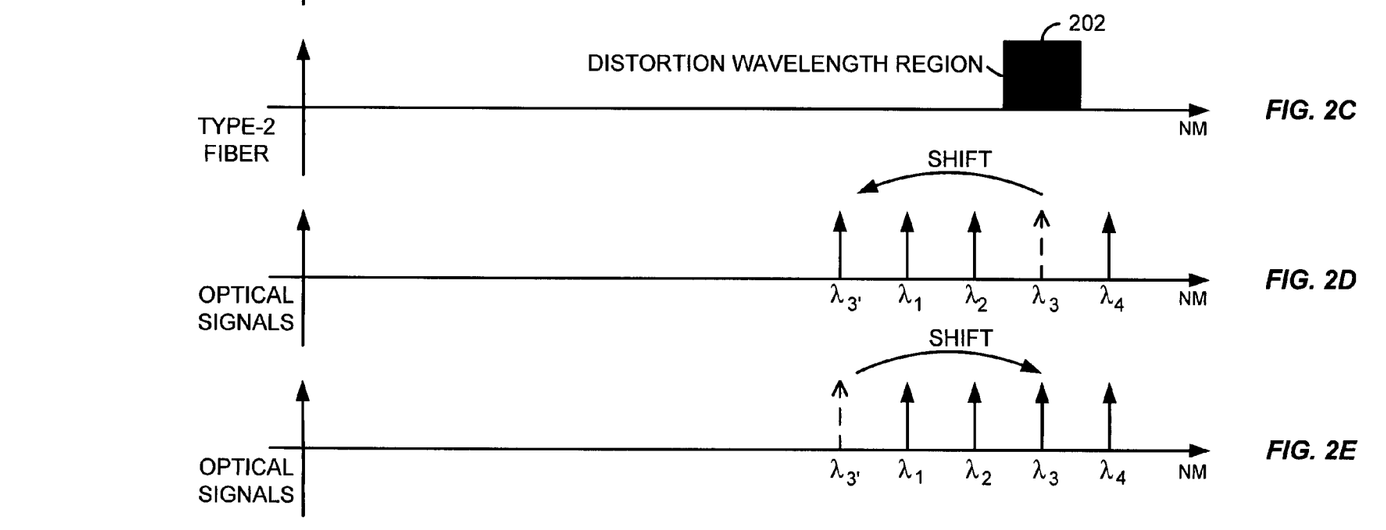
FIG. 2C illustrates a distortion wavelength region of a type-2 fiber span in an embodiment of the invention.
FIG. 2D illustrates optical signals with a wavelength shifted to another wavelength outside of a distortion wavelength region in an embodiment of the invention.
FIG. 2E illustrates optical signals with the wavelength outside of the distortion wavelength region shifted back to its original wavelength in an embodiment of the invention.

FIG. 2C illustrates a distortion wavelength region 202 of the type-2 fiber span 113 in an embodiment of the invention. The distortion wavelength region 202 is the range of wavelengths that is highly distorted by a type-2 fiber span. The distortion wavelength region 202 may comprise a high nonlinearity wavelength region for the type-2 fiber span 113. Comparing the wavelengths of the optical signals in FIG. 2A to the distortion wavelength region 202 of the type-2 fiber span 113 in FIG. 2C, one of the wavelengths ($\lambda_3$) falls within the distortion wavelength region 202 of the type-2 fiber span 113. This can be problematic, as the high distortion caused by the type-2 fiber span on wavelength $\lambda_3$ can result in a loss of data on $\lambda_3$.

Figure 3:
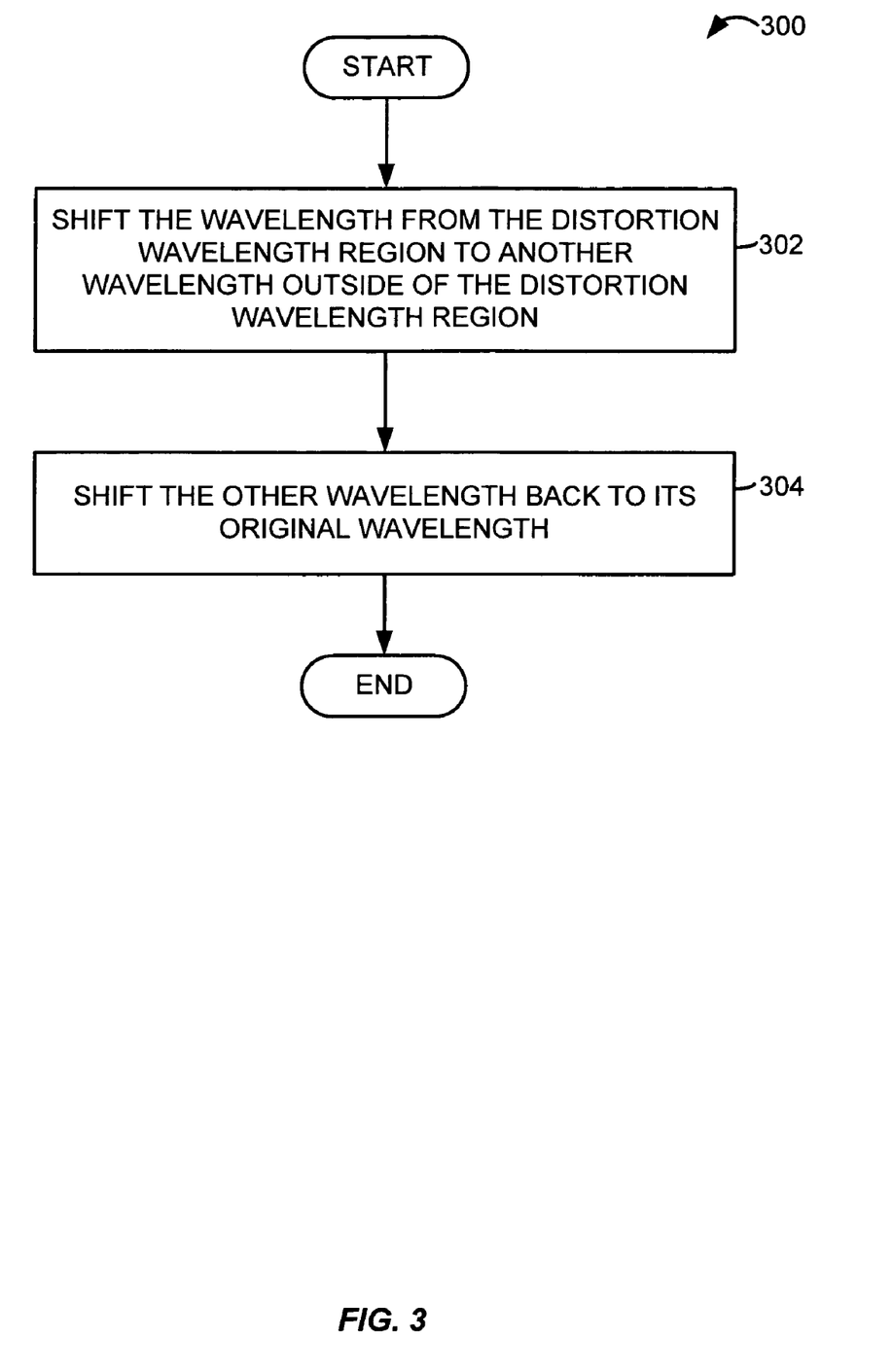
FIG. 3 is a flow chart illustrating a method of mitigating distortion in the optical network route of FIG. 1 in an embodiment of the invention.

FIG. 3 is a flow chart illustrating a method 300 of mitigating distortion in optical network route 100 in an embodiment of the invention. First, method 300 includes shifting the wavelength $\lambda_3$ in the distortion wavelength region 202 to a temporary wavelength ($\lambda_{3'}$) (see FIG. 2D) outside of the distortion wavelength region 202 in step 302. The shifting in step 302 takes place for optical signals entering fiber span 113. The shifting step 302 may take place as the optical signals enter fiber span 113, before the optical signals enter fiber span 113, or immediately after the optical signals enter fiber span 113. For instance, network component 122 may include a wavelength converter installed at the ingress point of the type-2 fiber span 113 to shift wavelength $\lambda_3$. Also, network component 122 may include an amplifier or other device capable of shifting wavelength $\lambda_3$, such as an amplifier 122A shown in an optical network route 100A depicted in FIG. 1. FIG. 2D illustrates the optical signals with wavelength $\lambda_3$ shifted to temporary wavelength $\lambda_{3'}$ in an embodiment of the invention. In this embodiment, wavelength $\lambda_3$ was shifted to a shorter wavelength $\lambda_{3'}$, but wavelength $\lambda_3$ may be shifted to a longer wavelength in other embodiments.

With wavelength $\lambda_3$ shifted to temporary wavelength $\lambda_{3'}$ as shown in FIG. 2D, the optical signals travel over fiber span 113 (see FIG. 1). After the optical signals travel over fiber span 113, method 300 includes shifting temporary wavelength $\lambda_3$ back to its original wavelength $\lambda_3$ (see FIG. 3) in step 304. The shifting in step 304 takes place for optical signals exiting fiber span 113. The shifting step 304 takes place immediately before the optical signals exit fiber span 113, as the optical signals exit fiber span 113, or after the optical signals exit fiber span 113 but before the optical signals are amplified or regenerated in network component 123. For instance, network component 123 may include a wavelength converter installed at the egress point of fiber span 113 to shift temporary wavelength $\lambda_{3'}$ back to original wavelength $\lambda_3$. Also, network component 123 may include an amplifier or similar device capable of shifting temporary wavelength $\lambda_{3'}$ back to original wavelength $\lambda_3$, such as an amplifier 123A shown in the optical network route 100A depicted in FIG. 1. FIG. 2E illustrates the optical signals with temporary wavelength $\lambda_{3'}$ shifted back to original wavelength $\lambda_3$ in an embodiment of the invention.

By using method 300, wavelength $\lambda_3$ may be used in optical network route 100 even though wavelength $\lambda_3$ falls in the distortion wavelength region of fiber span 113. In the prior art, network administrators would have had to avoid using wavelength $\lambda_3$ because of the distortion imparted by fiber span 113. Advantageously, method 300 allows network administrators to use wavelengths, such as wavelength $\lambda_3$, in certain routes that they could not previously use. Further, the shifting may advantageously be done with less expensive and less complex components, such as an all-optical wavelength converter, an all-optical amplifier, or a similar optical or optical-to-electrical-to-optical device. Network administrators may add or utilize these less expensive components to provide the wavelength shifting instead of using expensive and complex devices such as a complex Optical Add-Drop Multiplexer (O-ADM).

Figure 4:
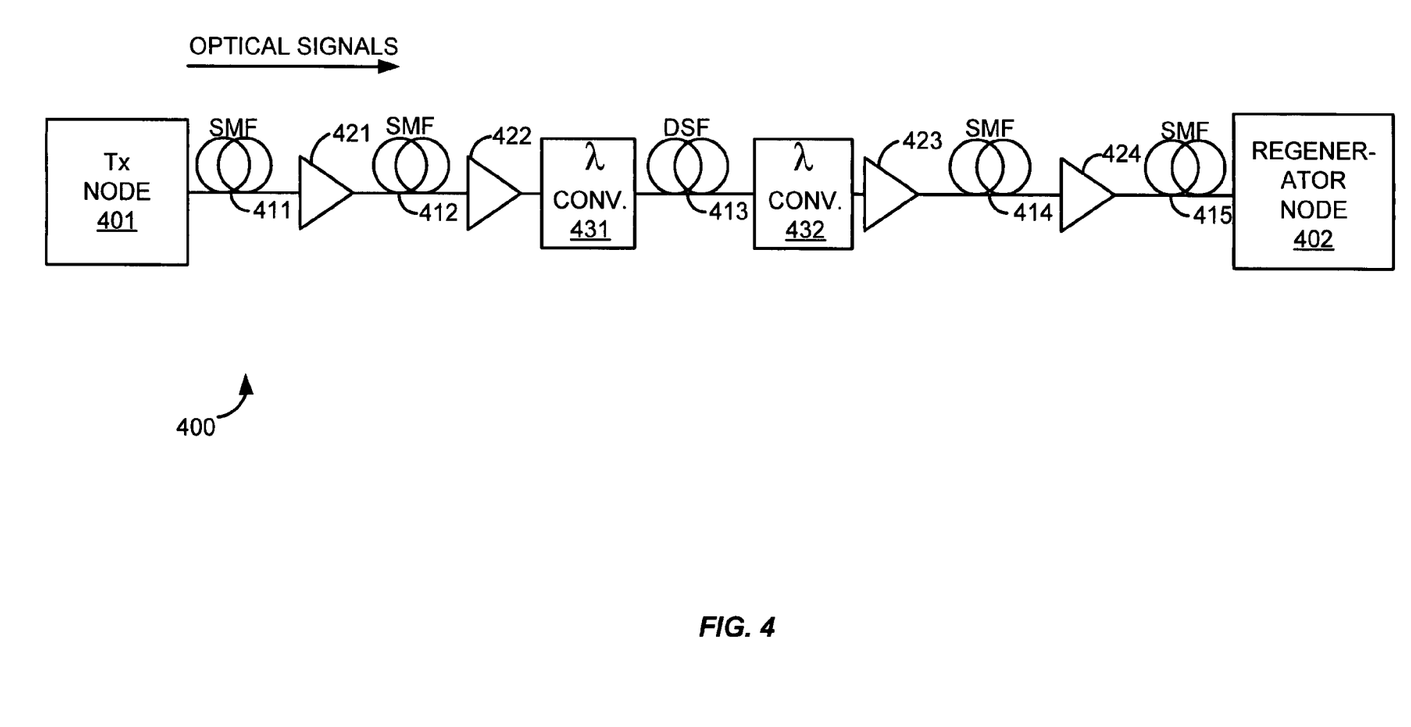
FIG. 4 illustrates an optical network route in another embodiment of the invention.

FIG. 4 illustrates an optical network route 400 in another embodiment of the invention. Optical network route 400 is part of a larger optical communication network (not shown). Optical network route 400 is comprised of a transmitter node 401, a regenerator node 402, a plurality of fiber spans 411-415, a plurality of amplifiers 421-424, and wavelength converters 431-432. Fiber span 411 connects transmitter node 401 to amplifier 421. Fiber span 412 connects amplifier 421 to amplifier 422. Fiber span 413 connects amplifier 422 to amplifier 423. Fiber span 414 connects amplifier 423 to amplifier 424. Fiber span 415 connects amplifier 424 to regenerator node 402. Wavelength converter 431 is coupled to fiber span 413 at an ingress point of fiber span 413. Wavelength converter 432 is coupled to fiber span 413 at an egress point of fiber span 413. The number of amplifiers and fiber spans is just for illustration in FIG. 4, and optical network route 400 may include any number of amplifiers, fiber spans, or other devices or components.

Fiber spans 411, 412, 414, and 415 comprise standard Single Mode Fibers (SMF). Fiber span 413 comprises a Dispersion Shifted Fiber (DSF). The nonlinearity effects of a SMF are different that the nonlinearity effects of a DSF. For instance, a SMF has high nonlinearity effects at about 1310 nm, whereas a DSF has high nonlinearity effects between about 1540 nm and 1560 nm.

Figure 5A:
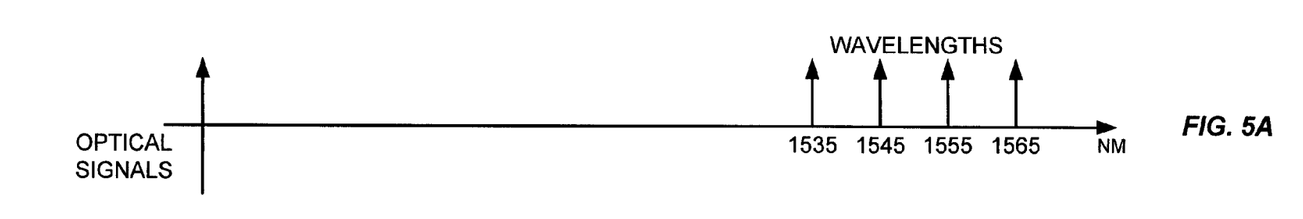
FIG. 5A illustrates wavelengths of optical signals traveling on the optical network route of FIG. 4 in an embodiment of the invention.

When in operation, transmitter node 401 transmits optical signals over optical network route 400. The optical signals include one or more original wavelengths that carry data. FIGS. 5A-5E are graphs stacked vertically to show wavelengths corresponding with one another. FIG. 5A illustrates the original wavelengths of the optical signals in an embodiment of the invention. The optical signals include four wavelengths (1535 nm, 1545 nm, 1555 nm, and 1565 nm) in this embodiment. The optical signals could include more or less wavelengths in other embodiments.

Figure 5B:
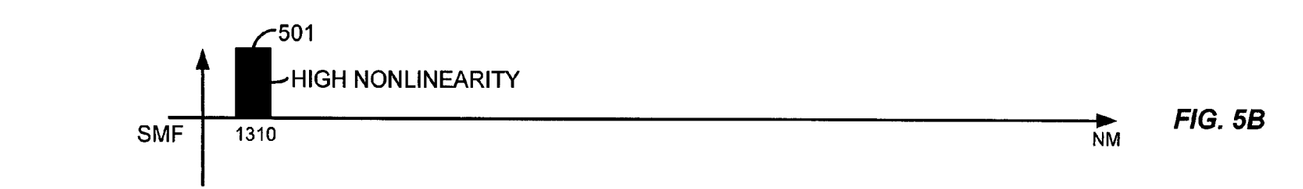
FIG. 5B illustrates a high nonlinearity wavelength region of Single Mode Fibers (SMF) in an embodiment of the invention.

FIG. 5B illustrates a high nonlinearity wavelength region 501 of the SMFs 411, 412, 414, and 415 in an embodiment of the invention. SMFs 411, 412, 414, and 415 have a high nonlinearity wavelength region 501 at about 1310 nm. Comparing the wavelengths of the optical signals in FIG. 5A to the high nonlinearity wavelength region 501 of the SMFs 411, 412, 414, and 415 in FIG. 5B, the wavelengths of the optical signals do not fall within the high nonlinearity wavelength region 501 of the SMFs 411, 412, 414, and 415.

Figures 5C, 5D:
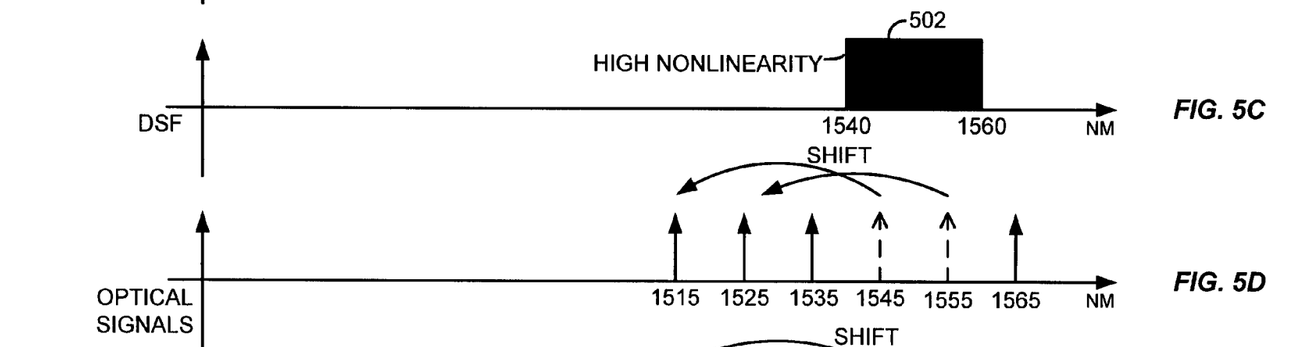
FIG. 5C illustrates a high nonlinearity wavelength region of a Dispersion Shifted Fiber (DSF) in an embodiment of the invention.
FIG. 5D illustrates optical signals with wavelengths shifted to other wavelengths outside of a high nonlinearity wavelength region in an embodiment of the invention.

FIG. 5C illustrates a high nonlinearity wavelength region 502 of DSF 413 in an embodiment of the invention. DSF 413 has a high nonlinearity wavelength region 502 between 1540 nm to 1560 nm. Comparing the wavelengths of the optical signals in FIG. 5A to the high nonlinearity wavelength region 502 of DSF 413 in FIG. 5C, two of the wavelengths (1545 nm and 1555 nm) fall within the high nonlinearity wavelength region 502 of DSF 113. This can be problematic, as the high distortion caused by DSF 413 on the 1545 nm and 1555 nm wavelengths can result in a loss of data.

To mitigate distortion in DSF 413, wavelength converter 431 receives the optical signals as they enter DSF 413 (see FIG. 4). Wavelength converter 431 shifts the 1545 nm wavelength to a temporary 1515 nm wavelength outside of the high nonlinearity wavelength region 502 of DSF 413. Also, wavelength converter 431 shifts the 1555 nm wavelength to a temporary 1525 nm wavelength outside of the high nonlinearity wavelength region 502 of DSF 413. FIG. 5D illustrates the optical signals with the 1545 nm wavelength shifted to the temporary 1515 nm wavelength and the 1555 nm wavelength shifted to the temporary 1525 nm wavelength in an embodiment of the invention. The temporary 1515 nm and 1525 nm wavelengths were selected as an illustration for this embodiment. A network administrator may use other desired wavelengths outside of the high nonlinearity wavelength region 502.

Figure 5E:
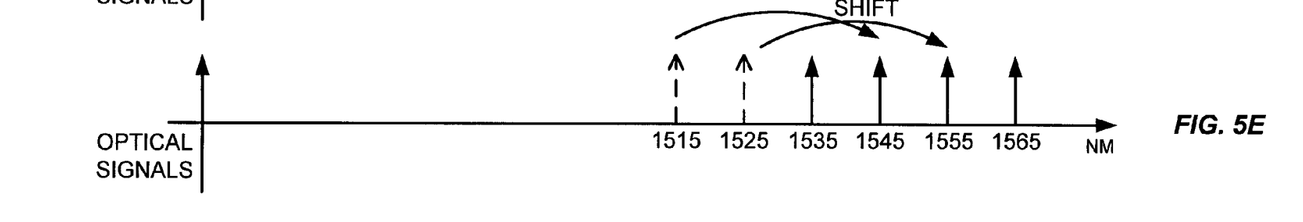
FIG. 5E illustrates optical signals with wavelengths outside of a high nonlinearity region shifted back to their original wavelengths in an embodiment of the invention.

With the wavelengths shifted as shown in FIG. 5D, the optical signals travel over DSF 413 (see FIG. 4). After the optical signals travel over DSF 413, wavelength converter 432 receives the optical signals as they exit DSF 413. Wavelength converter 432 shifts the optical signals back to their original wavelengths. Wavelength converter 432 shifts the temporary 1515 nm wavelength back to the 1545 nm wavelength and shifts the temporary 1525 nm wavelength back to the 1555 nm wavelength. FIG. 5E illustrates the optical signals with the wavelengths shifted back in an embodiment of the invention.

Wavelength converters 431-432 advantageously shift the wavelengths in the high nonlinearity wavelength region 502 of DSF 413 to shorter wavelengths that are not as significantly affected by the nonlinearities of DSF 413. Consequently, the 1545 nm wavelength and the 1555 nm wavelength may still be used in optical network route 400 to carry data.

What is claimed is:

1. A method of mitigating distortion in an optical network route, wherein the optical network route includes a plurality of fiber spans of a first type and a fiber span of a second type, wherein the second type of fiber span has a distortion wavelength region, wherein the optical network route is transporting optical signals having a plurality of original wavelengths wherein at least one, and fewer than all, of the original wavelengths is in the distortion wavelength region of the second type of fiber span, the method comprising the steps of:

maintaining those of the plurality of original wavelengths not in the distortion wavelength region of the second type of fiber span at the original wavelengths for the optical signals entering the second type of fiber span;

shifting the at least one original wavelength in the distortion wavelength region of the second type of fiber span to at least one temporary wavelength outside of the distortion wavelength region for the optical signals entering the second type of fiber span, wherein the at least one temporary wavelength is longer than each of the plurality of original wavelengths or shorter than each of the plurality of original wavelengths; and shifting the at least one temporary wavelength outside of the distortion wavelength region back to the at least one original wavelength for the optical signals exiting the second type of fiber span.

2. The method of claim 1 further comprising the steps of:

installing a first wavelength converter at an ingress point of the second type of fiber span to shift the at least one original wavelength in the distortion wavelength region to the at least one temporary wavelength outside of the distortion wavelength region; and installing a second wavelength converter at an egress point of the second type of fiber span to shift the at least one temporary wavelength back to the at least one original wavelength.

3. The method of claim 1 wherein:

the step of shifting the at least one original wavelength in the distortion wavelength region to the at least one temporary wavelength outside of the distortion wavelength region comprises shifting the at least one original wavelength using a first amplifier connected to the second type of fiber span; and the step of shifting the at least one temporary wavelength back to the at least one original wavelength comprises shifting the at least one temporary wavelength using a second amplifier connected to the second type of fiber span.

4. The method of claim 1 wherein:

the step of shifting the at least one original wavelength in the distortion wavelength region to the at least one temporary wavelength outside of the distortion wavelength region comprises shifting the at least one original wavelength in a regenerator node connected to the second type of fiber span; and the step of shifting the at least one temporary wavelength back to the at least one original wavelength comprises shifting the at least one temporary wavelength using an amplifier connected to the second type of fiber span.

5. The method of claim 1 wherein:

the step of shifting the at least one original wavelength in the distortion wavelength region to the at least one temporary wavelength outside of the distortion wavelength region comprises shifting the at least one original wavelength using an amplifier connected to the second type of fiber span; and the step of shifting the at least one temporary wavelength back to the at least one original wavelength comprises shifting the at least one temporary wavelength in a regenerator node connected to the second type of fiber span.

6. The method of claim 1 wherein the distortion wavelength region of the second type of fiber span comprises a high nonlinearity wavelength region for the second type of fiber span.

7. The method of claim 1 wherein the step of shifting the at least one original wavelength in the distortion wavelength region to the at least one temporary wavelength outside of the distortion wavelength region comprises shifting the at least one original wavelength to a shorter wavelength outside of the distortion wavelength region.

8. The method of claim 1 wherein the step of shifting the at least one original wavelength in the distortion wavelength region to the at least one temporary wavelength outside of the distortion wavelength region comprises shifting the at least one original wavelength to a longer wavelength outside of the distortion wavelength region.

9. The method of claim 1 wherein the optical network route comprises a route on a long haul network.

10. The method of claim 1 wherein the optical network route comprises a route on an ultra-long haul network.

11. An optical network route for transporting optical signals, the optical network route comprising:

a plurality of network components; and a plurality of fiber spans connecting the network components, wherein the plurality of fiber spans includes fiber spans of a first type and a fiber span of a second type, wherein the second type of fiber span has a distortion wavelength region;

wherein a first one of the network components is connected to an ingress point of the second type of fiber span, the first network component receives the optical signals wherein at least one, and fewer than all, of the original wavelengths of the optical signals is in the distortion wavelength region of the second type of fiber span, maintains those of the original wavelengths not in the distortion wavelength region of the second type of fiber span at the original wavelengths, and shifts the at least one original wavelength from the distortion wavelength region to at least one temporary wavelength outside of the distortion wavelength region, wherein the at least one temporary wavelength is longer than each of the original wavelengths or shorter than each of the original wavelengths;

wherein a second one of the network components is connected to an egress point of the second type of fiber span, the second network component receives the optical signals with the at least one temporary wavelength outside of the distortion wavelength region, and shifts the at least one temporary wavelength back to the at least one original wavelength.

12. The optical network route of claim 11 wherein:

the first network component comprises a first wavelength converter that shifts the at least one original wavelength in the distortion wavelength region to the at least one temporary wavelength outside of the distortion wavelength region; and the second network component comprises a second wavelength converter that shifts the at least one temporary wavelength back to the at least one original wavelength.

13. The optical network route of claim 11 wherein:

the first network component comprises a first amplifier that shifts the at least one original wavelength in the distortion wavelength region to the at least one temporary wavelength outside of the distortion wavelength region; and the second network component comprises a second amplifier that shifts the at least one temporary wavelength back to the at least one original wavelength.

14. The optical network route of claim 11 wherein:

the first network component comprises a regenerator node that shifts the at least one original wavelength in the distortion wavelength region to the at least one temporary wavelength outside of the distortion wavelength region; and the second network component comprises an amplifier that shifts the at least one temporary wavelength back to the at least one original wavelength.

15. The optical network route of claim 11 wherein:

the first network component comprises an amplifier that shifts the at least one original wavelength in the distortion wavelength region to the at least one temporary wavelength outside of the distortion wavelength region; and the second network component comprises a regenerator node that shifts the at least one temporary wavelength back to the at least one original wavelength.

16. The optical network route of claim 11 wherein the distortion wavelength region for the second type of fiber span comprises a high nonlinearity wavelength region for the second type of fiber span.

17. The optical network route of claim 11 wherein the first network component shifts the at least one original wavelength to a shorter wavelength outside of the distortion wavelength region.

18. The optical network route of claim 11 wherein the first network component shifts the at least one original wavelength to a longer wavelength outside of the distortion wavelength region.

19. The optical network route of claim 11 wherein the optical network route comprises a route on a long haul network.

20. The optical network route of claim 11 wherein the optical network route comprises a route on an ultra-long haul network.

* * * * *